United States Patent [19]
Ju et al.

[11] Patent Number: 5,905,707
[45] Date of Patent: May 18, 1999

[54] OPTICAL GRATING FOR A BIFOCAL ACCESS HEAD OF OPTICAL DISK DRIVE DEVICES

[75] Inventors: Jau-Jiu Ju, Chutung Town; Tsung-Ming Yang, Chilung; Shin-Ter Tsai, Taipei; Pei-Yih Liu, ChiChou Hsiang, all of Taiwan

[73] Assignee: Industrial Technology Research Institute, Taiwan

[21] Appl. No.: 08/798,765

[22] Filed: Feb. 11, 1997

[30] Foreign Application Priority Data

Nov. 23, 1996 [TW] Taiwan ................................ 85218081

[51] Int. Cl.$^6$ ....................................................... G11B 7/00
[52] U.S. Cl. ................................ 369/109; 369/58; 369/94; 369/112
[58] Field of Search .............................. 369/32, 112, 109, 369/103, 58, 110, 44.23, 44.24, 44.12, 94

[56] References Cited

U.S. PATENT DOCUMENTS

| | | | |
|---|---|---|---|
| 5,066,138 | 11/1991 | Toide et al. ............................... | 369/112 |
| 5,446,565 | 8/1995 | Komma et al. .......................... | 369/103 |
| 5,526,338 | 6/1996 | Hasman et al. ............................. | 369/94 |
| 5,636,190 | 6/1997 | Choi .......................................... | 369/94 |
| 5,671,207 | 9/1997 | Park .......................................... | 369/94 |
| 5,724,335 | 3/1998 | Kobayashi ............................... | 369/112 |

*Primary Examiner*—Nabil Hindi
*Attorney, Agent, or Firm*—Pillsbury Madison & Sutro LLP

[57] ABSTRACT

A grating pattern for a bifocal optical pick-up head assembly of an optical compact disc drive device is disclosed. The device is capable of accessing data on the surface of compact discs arranged in either the DVD or the CD formats. The optical head assembly has an optical system that includes a grating plate and an objective, wherein the grating plate contains the grating pattern, and the objective focuses a light beam onto the data surface of the accessed compact disc. The grating pattern includes a first region that contains no grating and a second region that contains grating. The first region substantially surrounds the second region. The light beam that passes through the first region of the grating pattern is incident to the cross-sectional aperture of the objective for the DVD format of the accessed optical disk. The light beam that passes through the second region of the grating pattern is incident to the cross-sectional aperture of the objective for the CD format of the accessed optical disk.

12 Claims, 10 Drawing Sheets

OPTICAL GRATING FOR A BIFOCAL ACCESS HEAD OF OPTICAL DISK DRIVE DEVICES

BACKGROUND OF THE INVENTION

1. Field of the Invention

This invention relates in general to the optical access head for a disk drive device of the compact disc category. In particular, this invention relates to the optical grating for the optical pick-up head for high-density digital video discs (DVD) capable of operating at very high access resolution.

2. Description of Related Art

Compact disc (CD), originally developed for the optical information storage of musical data, has evolved into a diversified category of formats used for the storage of digital data in various applications. In comparison to other media of storage, the optical compact disc is a media with such inherent advantageous features as relatively large storage capacity, easy archive for long period of time, low cost, as well as integrity of contained data, among others.

Conventional magnetic-based storage media has thus been gradually replaced by compact discs whenever applications such as multimedia which require accessing large amounts of data are involved. Such applications include audio CD for high-fidelity music reproduction, video CD (VCD) that plays both video and music information, CD-Interactive (CD-I) for user interactive participation in computer entertainment and education programs, CD-recordable (CD-R) and CD-erasable (CD-E) for the mass storage of digital data for computer information archiving, and the popular CD-read-only memory (CD-ROM) for the storage of computer program and data, to name a few.

Many of these compact disc formats involve the use of computer systems and are accessible via various types of computer peripheral devices known as CD drives. As a result of rapid technical advancements in laser optics and data compression schemes, ever higher storage capacity in the compact disc media has become a highly-pursued object in this industry, aiming at ever more sophisticated applications involving large amounts of graphical, video and/or audio data.

To manufacture and utilize compact discs having high density storage capacity, high optical resolution in the read and write accesses of the compact discs are the key factor. Physical laws indicate that optical resolution is a function of two parameters, the wavelength of light used for the access of data in the disc, and the numerical aperture (NA) of the objective of the access head assembly. Essentially, both shorter wavelength and larger numerical aperture are factors for increased optical resolution.

Among these two factors in the practical optical systems built for the access of data stored in compact discs, however, larger numerical aperture require extremely high precision of the optical system constructed. In a system employing an objective with a large numerical aperture, even a slight skew of the relative position of the access head assembly with respect to the normal placement of the compact disc invites excessive imaging problems. Such imaging problems, including incorrect focusing and displaced image formation, cause difficulties in the recognition of the data received in the access operation. This represents a serious problem in the manufacture of mass-production commercial models of compact disc devices. One of the obvious solutions to this problem is to reduce the thickness of the substrate used as the physical basis of the compact disc.

Two of the widely-publicized standards intended for use in the next-generation multimedia applications are the Multi-Media CD (MMCD) and the Digital Video Disc (DVD) each supported by their respective consortium. After the initial development in the process of negotiations between the two, it appeared that a unified standard adopting the physical specifications of the DVD had been achieved.

One of the important aspects of the newly-defined DVD standard is its compatibility with the vast number of popular CD-ROMs currently in existence. In other words, the new optical peripheral devices developed for the DVD standard must be equipped with the ability to access traditional CD-ROMs in addition to its normal capability to access DVDs. To achieve this, variable focusing and tracking functionalities must be designed into the system. This way, adjustments in these functionalities can be implemented to so that the use of the system can be suitable for either the traditional CD-ROM or the new DVD media. This means a bifocal focusing system must be developed for focusing the access head of the DVD device. In addition, a tracking system with dual tracking capability must be developed.

In general, many traditional CD-ROM devices employ a three-beam tracking method, while some high-density optical disc devices employ either heterodyne tracking or differential phase detection. However, the circuitry required for access head tracking control and the subsequent data signal processing suitable for use along with the heterodyne and the differential phase detection methods is much more complicated than for the conventional three-beam method.

DVD and CD have the substrate thickness of 0.6 and 1.2 mm respectively, while the numerical aperture of their corresponding objectives are 0.6 and 0.38 respectively. Since, as mentioned above, the DVD device must be able to access both the high-density DVD and the normal CD, a bifocal design is therefore necessary. In order to further outline the background of the invention, with reference to FIGS. 1 and 2 of the accompanying drawings, description of a conventional bifocal access head is provided in the following paragraphs.

Refer to FIG. 1. A perspective view schematically shows the physical construction of a conventional bifocal pick-up head for a compact disc drive device. As is illustrated, this is a system with dual objectives 12 and 14 each compatible with the data access requirements for one compact disc format standard.

Specifically, the objective 12 having large numerical aperture and short focus length is suitable for accessing DVD, while the other lens 14 having relatively smaller numerical aperture and longer focus length is for accessing the traditional CD and CD-ROM. Use of one of the two objectives in the system is selected via some mechanical servo mechanism that switches between the two. In other words, based on the use of the type of compact disc media in the system, the suitable objective is switched into the proper position in the path of the access head light system. In such a system, due to the use of single-focus objectives, a highest possible light energy efficiency can be achieved. However, the system also suffers from the following disadvantages.

First, a precision mechanical switching servo mechanism has to be used to allow correct positioning of the selected lens into the light path. The complex and precision mechanical system adds to the complexity of the access head assembly and increases the device component's costs. Furthermore, the use of position sensors and a control system necessary for performing the lens-positioning operations adds to the production labor costs.

FIG. 2 schematically illustrates the light path system of a conventional bifocal access head assembly employing the objective HOE focusing method. In this system, the illuminating light beam is produced by the laser diode 22 which is reflected at the beam-splitter 24 and then focused by the HOE objective 26 into the data plane of the media to be accessed. Due to diffraction, the first-order light is focused at a relatively longer focal length in the data plane embedded in the thick substrate 29 for such media as the conventional CD or CD-ROM. While the zero-order light is focused at a relatively shorter focal length in the data plane embedded in the thin substrate 28 for such media as DVD. In either case, the data light beam, as reflected by the accessed media 28 or 29, is then focused again by the HOE objective 26 and forms the image on the light sensor 25 via direct passage through the beam-splitter 24. The image patterned over the surface of the sensor 25 reflects the data content of either binary 0 or 1 as accessed from the media.

This HOE bifocal scheme achieves a relatively simpler physical configuration by the integration of the HOE lens and the objective into one element. The configuration is simple enough that even the popular mechanical configuration of the conventional CD can be adopted. Imaging resolution is very good for zero-order light. However, the following disadvantages remain:

First, it is relatively difficult to implement HOE directly in an objective. Complex lens making procedures must be involved in the making of these HOE lenses. Secondly, a significant portion, typically up to about 24 percent, of the light energy is lost in the use of HOE lens.

Further comparisons between the dual objective and HOE schemes for achieving compatibility with two compact disc standards show that each has its own relative advantages. For example, based on the theory of diffraction, the HOE scheme of dual focusing has an improved imaging effect for the DVD media not found in the dual objective configuration.

Sony Corporation of Japan disclosed an imaging design in its video disc players. This was a scheme employing the use of a light filter on the back surface of the grating plate. FIGS. 3A–3D outline the concept of this design. As is clearly illustrated in the side elevational view of the grating plate 30 used in this Sony design, grating 31 was formed over the surface of the plate 30 while, over the opposite surface, a special filter coating 32 was formed. FIG. 3B schematically outlines the grating arrangement, and FIG. 3C shows the diffraction filter coating pattern arrangement. With this grating and filter coating arrangement for the Sony design, the corresponding light energy efficiency distribution pattern expressed as a function of distance along the light path is outlined in FIG. 3D. Although this design demonstrates very good characteristics, implementation of this scheme is particularly difficult, and its production involves complicated. The result is therefore very high cost.

SUMMARY OF THE INVENTION

It is therefore an object of the present invention to provide an optical grating pattern suitable for bifocal access operation of compact discs having one of two formats, in which the manufacture of the access head assembly involves low costs.

It is another object of the present invention to provide an optical grating pattern suitable for bifocal access of compact discs having one of two formats, in which access to one of the two formats supports a very high resolution.

The present invention achieves the above-identified objects by providing a grating pattern for the bifocal optical pick-up head assembly of an optical compact disc drive device. The device is capable of accessing data on the surface of the compact discs arranged in each of two formats. The optical head assembly has an optical system that includes a grating plate and an objective, wherein the grating plate contains the grating pattern, and the objective focuses a light beam onto the data surface of the accessed compact disc. The grating pattern includes a first region that contains no grating and a second region that contains grating. The first region substantially surrounds the second region. The light beam that passes through the first region of the grating pattern is incident on the cross-sectional aperture of the objective for the first format of the accessed optical disk. The light beam that passes through the second region of the grating pattern is incident on the cross-sectional aperture of the objective for the second format of the accessed optical disk.

BRIEF DESCRIPTION OF THE DRAWINGS

Other objects, features, and advantages of the present invention will become apparent by way of the following detailed description of the preferred but non-limiting embodiments. The description is made with reference to the accompanying drawings in which.

DESCRIPTION OF THE PREFERRED EMBODIMENT

Figure 1:
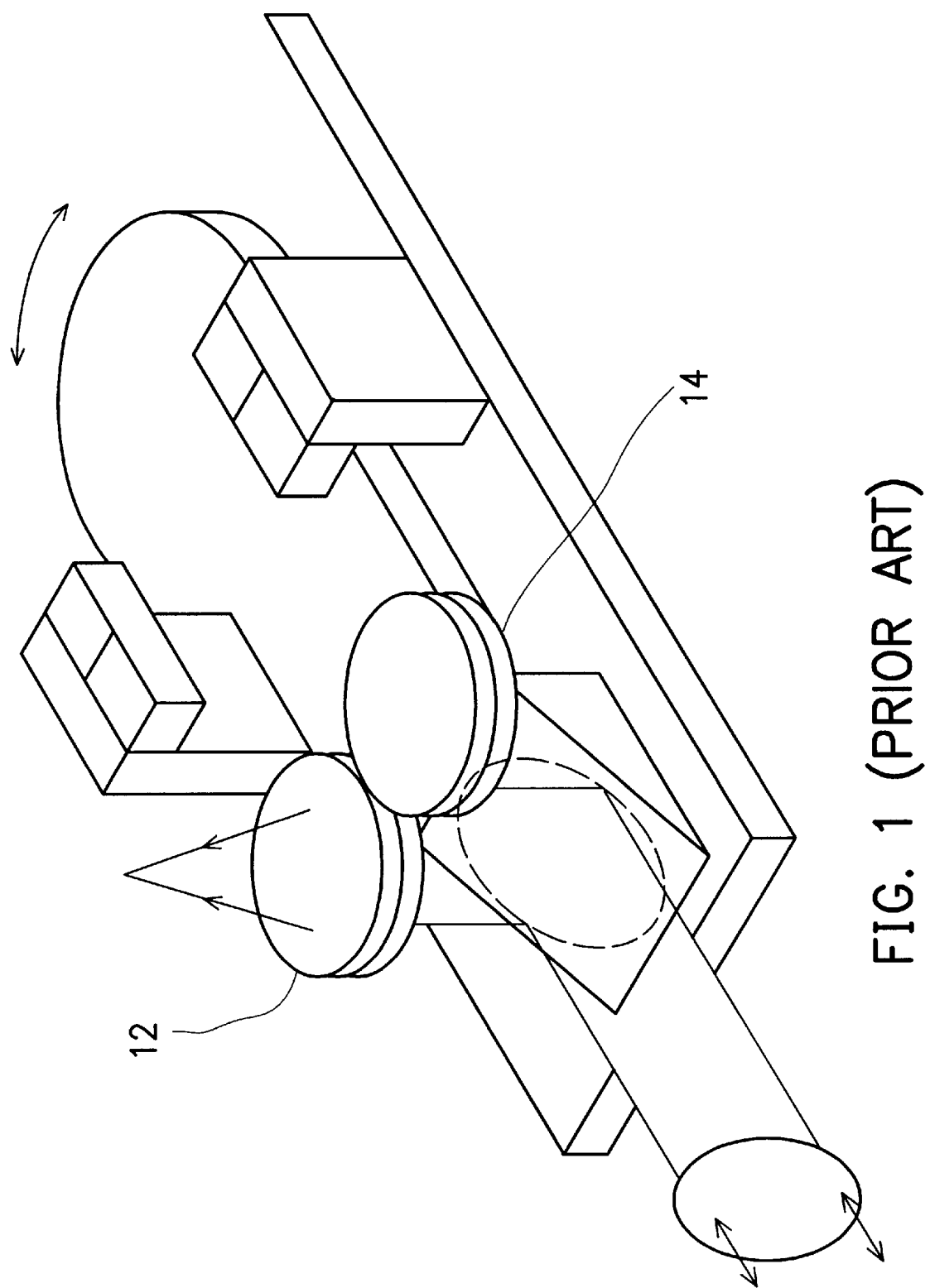
FIG. 1 is a perspective view schematically illustrating the physical construction of a conventional bifocal pick-up head for a compact disc drive device.
Figure 2:
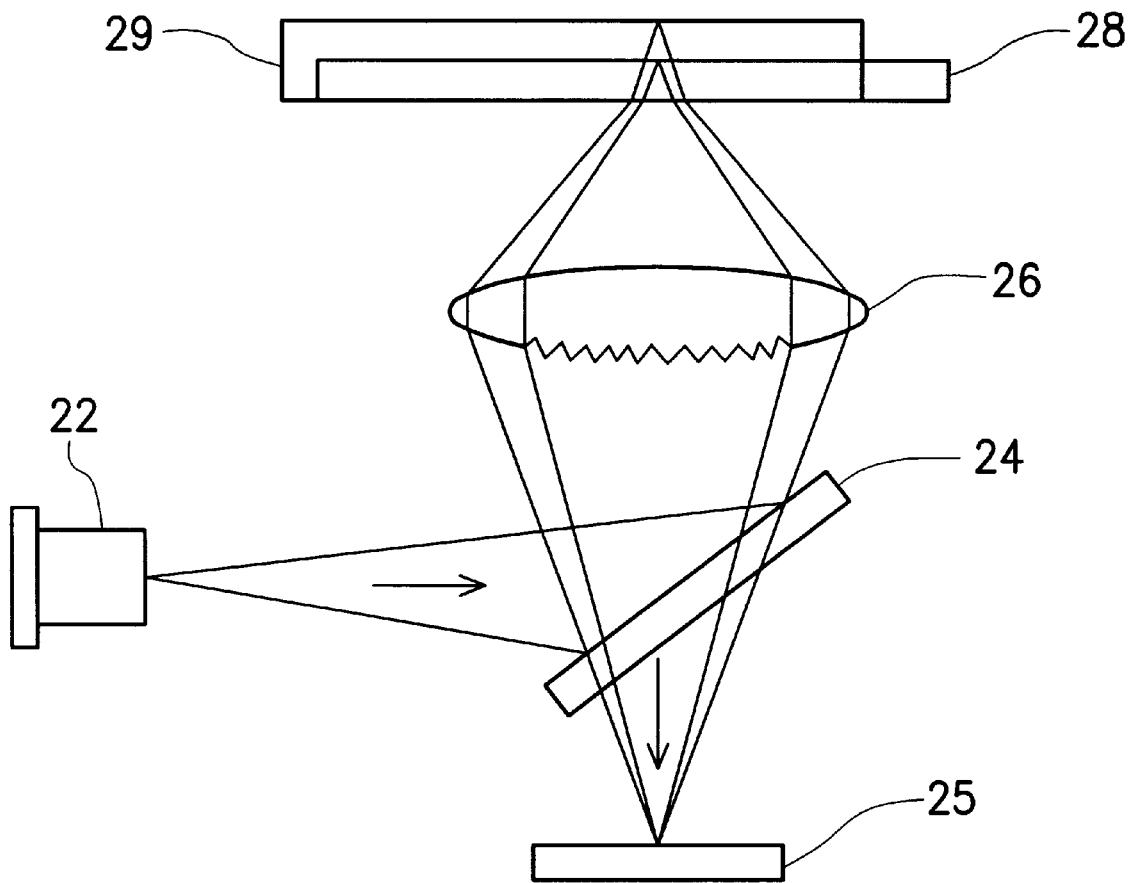
FIG. 2 schematically illustrates the light system of a conventional bifocal access head employing the objective HOE focusing method.
Figure 3A:
FIGS. 3A–3D schematically outline the grating and filtering arrangement of a prior-art video disc player and its achieved light energy efficiency characteristics.
Figure 3B:
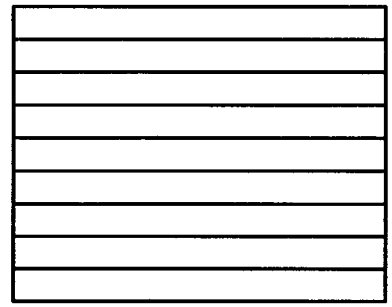
Figure 3C:
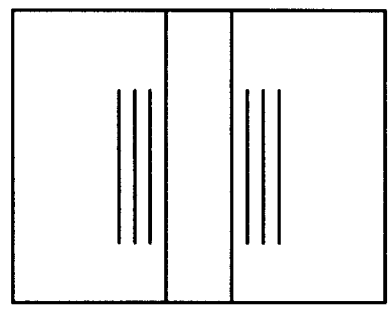
Figure 3D:
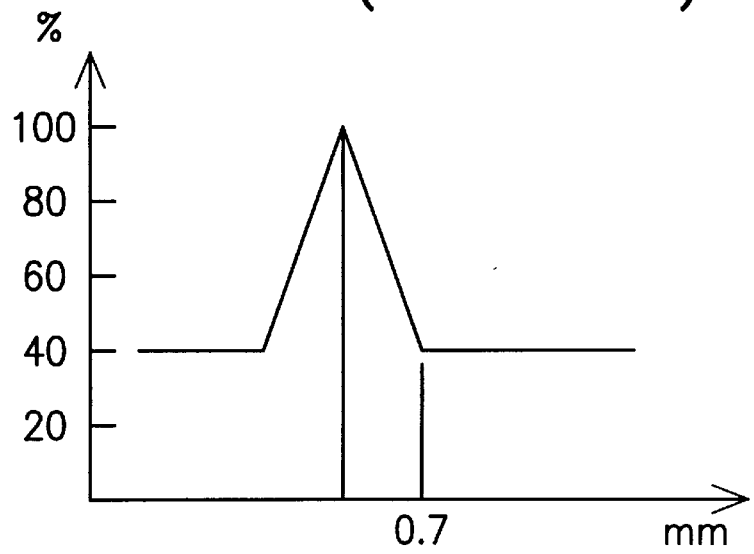

Before commencing the detailed description of the preferred embodiment of the optical grating in accordance with the invention, the underlying theory of the invention is examined. When a laser beam is used as the data access light in these compact disc devices, at least four parameters are involved in determining the size of the image as the laser beam, after alignment via the collimating lens, is incident into the objective and focused onto the data plane of the access media disc. These parameters include:

1. Numerical aperture of the objective,
2. Wavelength of the laser light used,
3. Wavefront distortion, and
4. Energy distribution characteristics in the pupil plane.

Among the above four, 1 to 3 are substantially fixed parameters that do not change for a specific design. Thus, the pupil plane energy distribution characteristics becomes the only parameter that allows for manipulation in the pursuit of designing a system capable of superior imaging resolution. If Gaussian distribution was used to describe the energy distribution characteristics over the pupil plane, then the amplitude distribution of the light beam can be expressed as $|G(x, y)|$:

$$|G(x,y)| = \text{Exp}(-2 \times h^2 \times p^2)$$

wherein x, y are the two-dimensional coordinates in the pupil plane, h is the Gaussian cross-sectional parameter, and p is the radius of the pupil.

Then, the amplitude distribution in the imaging plane can be expressed as $U(P, Q)$. Let $\lambda$ represent the wavelength of the light used, and F the focal length, thus, there is $$U(P, Q) = |G(x,y)| \times \text{Exp}((-2\pi i/\lambda F) \times (Px+Qy)) dxdy.$$

After the variable conversion of $x = p \times \cos\theta$, $y = p \times \sin\theta$, $P = r \times \cos\phi$, and $Q = r \times \sin\phi$, P and Q become the coordinates in the imaging plane. Since there are $r^2 = P^2 + Q^2$, $p^2 = x^2 + y^2$, $\phi = \tan^{-1}(Q/P)$, $\theta = \tan^{-1}(y/x)$, therefore, $$U(r, \phi) = \text{Exp}(-\tfrac{1}{2} \times h^2 \times p^2) \times \text{Exp}((-2\pi i/\lambda F) \times rp \times \cos(\theta-\phi)) pdpd\theta,$$

and $$U(r) = \text{Exp}(-2 \times h^2 \times p^2) \times J_0(2\pi/\lambda \times NA \times p) pdpd\theta,$$

wherein $J_0$ is the Bessel function. Then, let SPOT represent the focusing function, $$\text{SPOT} = |U(r) \times \overline{U}(r)|,$$

and based on the above integration equation, focused spots of different Gaussian energy distribution characteristics can be calculated, as listed in Table 1 below.

TABLE 1

| $h^2$ | 0 | 0.693 | 1.0 | 1.2 | 1.5 | 2.0 | 3.0 | 4.5 | 8.0 |
|---|---|---|---|---|---|---|---|---|---|
| FWHM | 0.258 | 0.266 | 0.270 | 0.273 | 0.277 | 0.283 | 0.298 | 0.323 | 0.387 |
| $1/e^2$ | 0.409 | 0.424 | 0.431 | 0.435 | 0.442 | 0.455 | 0.482 | 0.526 | 0.643 |
| First Diffraction Ring | 0.610 | 0.641 | 0.656 | 0.664 | 0.680 | 0.710 | 0.780 | 0.925 | None |

In Table 1, h is the cut-off plane parameter of Gaussian beam before passing through the objective, FWHM represents the situation wherein the light energy is ½ after passing through the objective and being focused, $1/e^2$ represents the situation wherein the light energy is $1/e^2$ (about 14%) after passing through the objective and being focused, and First Diffraction Ring represents the situation wherein a first diffraction ring image is formed after passing through the objective.

Figure 4:
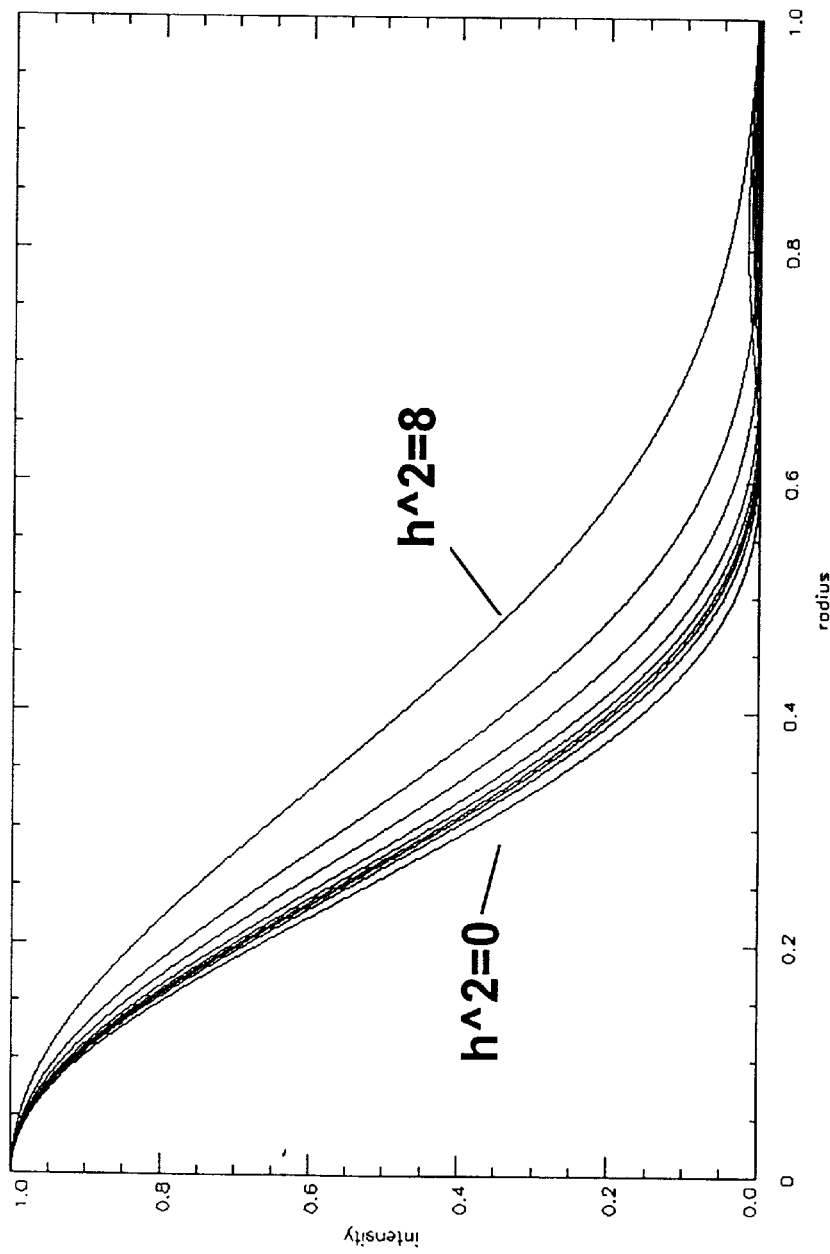
FIG. 4 depicts the light spot distribution characteristic curvatures based on calculation for various Gaussian beams at the cut-off plane.

In Table 1, the column with $h^2=0$ represents a uniform light beam distribution, and $h^2=0.693$ is the case wherein the cut-off energy in the pupil plane is 50%. The distribution curvatures based on this integration calculation are outlined in FIG. 4, that is, FIG. 4 depicts the light spot distribution characteristic curvatures based on calculations for various Gaussian beams in the cut-off plane.

Thus, after the focusing via a single-focal objective, the spot size of an image of a Gaussian beam with different degrees of truncation can be expressed as:

$$\text{SPOT\_SIZE} = 2 \times r = 2 \times C \times \lambda/NA, \quad (1)$$

wherein

NA equals $n \times \sin\theta$ which is the numerical aperture of the objective that also indicates the maximum focusing convergent angle $\theta$ as the light beam passes, n is the coefficient of refraction, $\lambda$ is the wavelength, and C is a coefficient related to the energy in the light spot imaged by the Gaussian beam having different degrees of truncation.

As can be observed in the above equation expressing the size of an imaged spot, a larger C value represents a larger light spot. Values of C can be found in Table 1 above, wherein spot size and energy distribution characteristics in the imaged spot are listed for energy distribution in the Gaussian cut-off plane (incident pupil plane).

Based on the above equation (1), and together with the listings in Table 1, it can be observed that the size of the imaged spot is closely related to the energy intensity contained therein. In other words, the larger the ratio between the energy intensity at the central region of the pupil plane and that at the peripheral region, the larger the size of the imaged spot. The reverse is also true, that is, the smaller the intensity ratio of the central to the peripheral regions over the imaged pupil plane, the smaller the size of the imaged light spot. For application considerations in the construction of an access head for compact disc devices, it is advantageous to have a smaller-sized light spot based on the same energy level contained therein.

Figure 5:
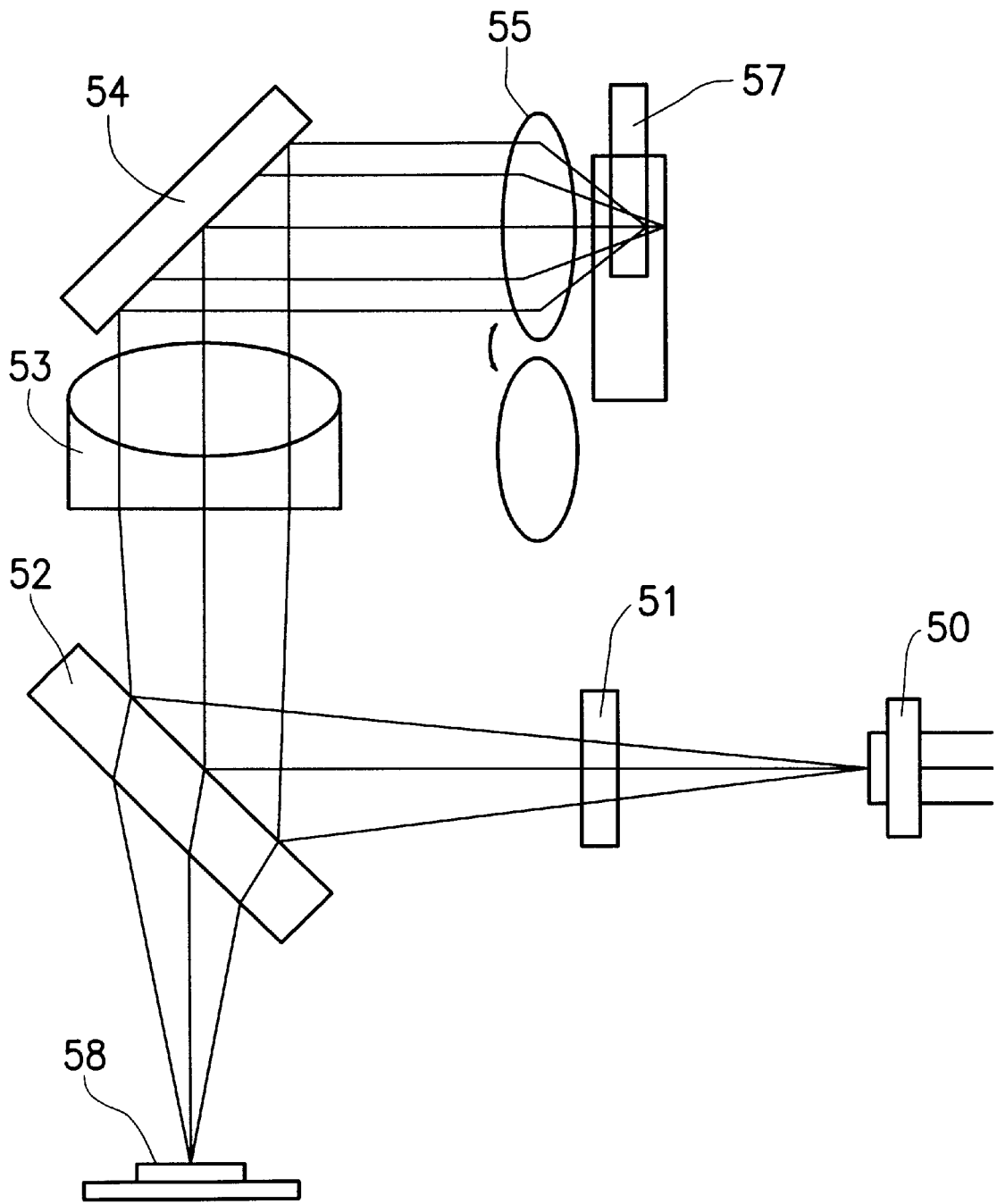
FIG. 5 schematically illustrates the light system of a bifocal access head assembly employing the grating in accordance with a preferred embodiment of the invention.

Refer to FIG. 5 of the drawing, in which the light system of a bifocal access head employing the grating in accordance with a preferred embodiment of the invention is schematically illustrated. Observing the arrangement in the system of FIG. 5, a laser diode 50 generates a laser beam that is split into three beams via passage through a grating plate 51. The three principle beams are then reflected at the beam-splitter 52 and aligned parallel by the collimator lens 53. The result is the three parallel beams incident on the reflective mirror 54. The three beams coming from the mirror 54 are then passed through one of the objective 55 mechanically switched into position for imaging at the data plane embedded in the substrate of the accessed media.

In the case of accessing to the conventional CD, a longer wavelength requires a longer focus to form an image over the data plane of the CD media 56 with the thicker substrate. On the other hand, when a DVD is accessed, the shorter wavelength requires shorter focus to form an image over the data plane of the DVD media 57 with a thinner substrate.

Then, the illuminating light beams that reach the data plane of the accessed media, either CD 56 or DVD 57, are reflected back to the sensor in a return path. Specifically, the return path of the signal light beam is coincident with the illuminating beam until it comes to the beam-splitter 52. Instead of being reflected back into the laser diode, the signal beams conveying the digital 0s and 1s are passed through the beam-splitter 52 and received by the sensor 58. This generally concludes a data access cycle in the compact disc media.

Figure 6C:
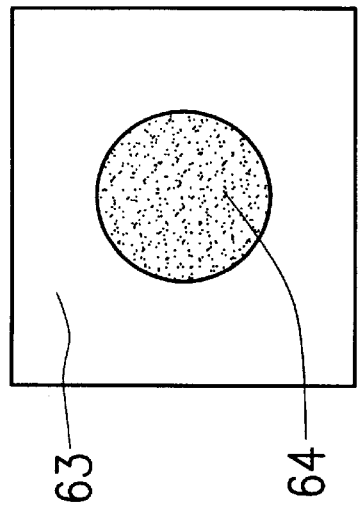
FIGS. 6A–6H depict some possible implementations of the grating pattern arrangement for the grating design of the invention.
Figure 6D:
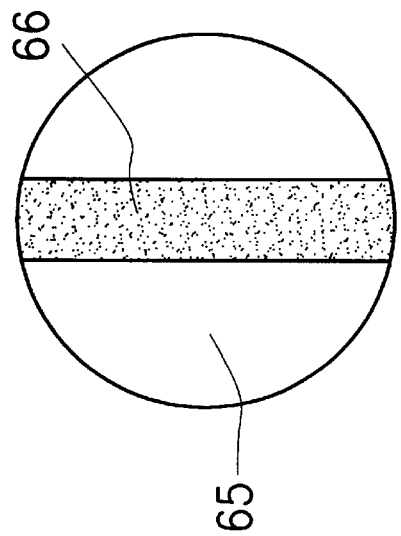
Figure 6A:
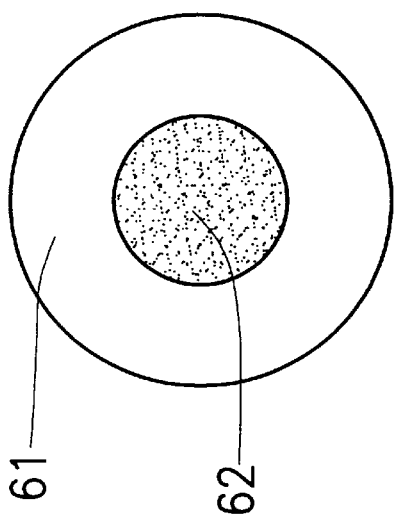

FIGS. 6A–6H are used to illustrate the possible pattern designs of the grating implemented on the grating plate 51 of FIG. 5 embodying the concept of the invention. First, as shown in FIG. 6A, the overall grating pattern design includes two concentric regions 61 and 62, with the ring-shaped region 61 surrounding the disc-shaped region 62. Note that grating is implemented in region 62 but not in 61.

Figure 6B:
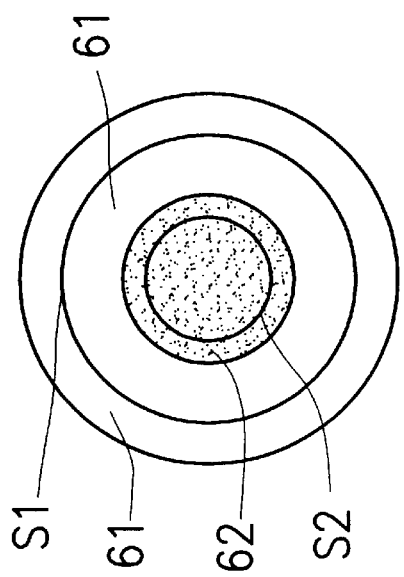

Refer to FIG. 6B. The beam passing through the region defined by the S1 circle is correspondent to the cross-sectional aperture of the DVD objective. On the other hand, the beam passing through the region defined by the S2 circle is correspondent to the cross-sectional aperture of the CD objective. Among the two, the S1 circle must be present inside region 61, while the S2 circle may be inside either region 61 or 62. However, S1 is always larger then S2.

Figure 6G:
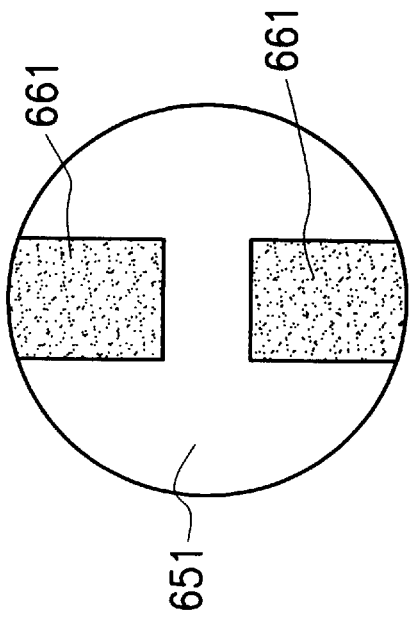
Figure 6H:
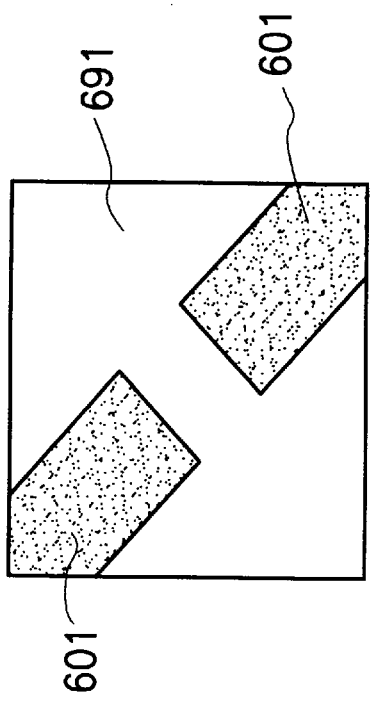
Figure 6E:
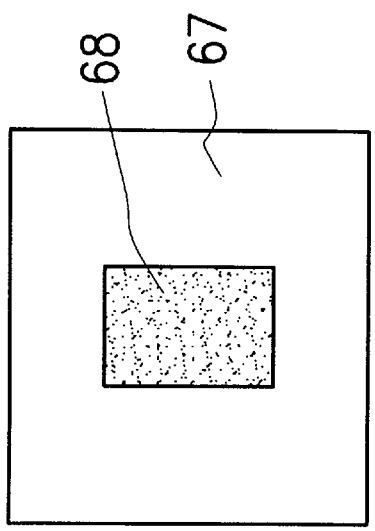
Figure 6F:
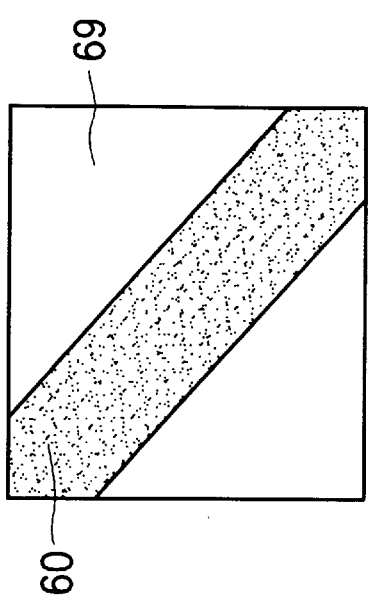

As is illustrated in another embodiment depicted in FIG. 6C, the grating region 64 may be circular, or even elliptical in shape while the non-grating region 63 is rectangular. In still another embodiment depicted in FIG. 6D, the grating region 66 can be rectangular while the non-grating region 65 is circular. Further, in the embodiment of FIG. 6E, the grating and non-grating regions 68 and 67 respectively can be both rectangular regions. Further, as illustrated in the embodiment of FIG. 6F, the non-grating region 69 is shown to be rectangular while the grating region 60 is polygonal. Further still, as illustrated in the embodiment of FIG. 6G and FIG. 6H ,the grating regions are 661 and 601 respectively ,and the non-grating regions are 651 and 691 respectively.

Thus, as persons skilled in the art may well appreciate, the grating pattern design for the invention can be as diversified as possible. Virtually any shape convenient for production can be applied to the grating and non-grating regions of the grating pattern made over the grating plate 51 of FIG. 5. The essential condition being that two regions defined over the surface of the grating plate constitute a complete grating design, with one containing grating generally surrounding the other without grating.

When any of the grating designs exemplified in drawings 6A–6H is used in the bifocal system of FIG. 5 for accessing a compact disc of the DVD standard, an actuator mechanism (not shown) aligns the objective with a numerical aperture of about 0.6 into position. The energy distribution characteristics of the light beam after passage through the grating plate 51 and before the objective are depicted in FIG. 7A.

Figure 7A:
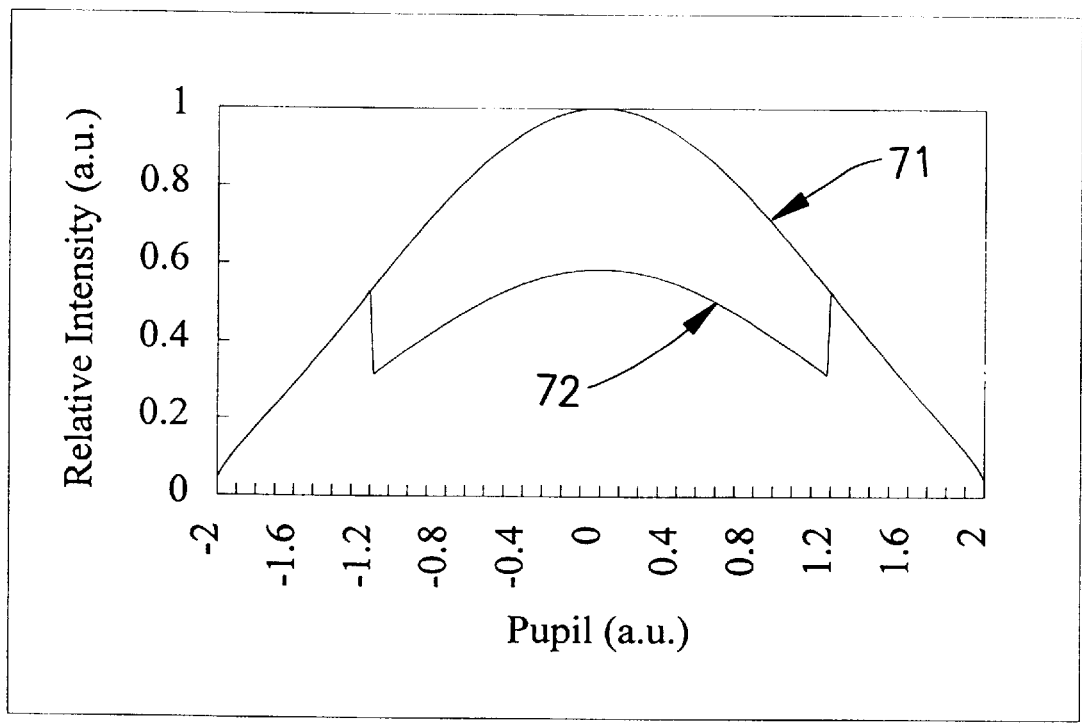
FIG. 7A compares the energy distribution characteristics of a bifocal system employing the conventional grating design to one employing the grating of the invention, wherein the light beam energy level is collected for the compared light beams after passage via the grating plate and before passing into the objective.

Specifically, FIG. 7A compares the energy distribution characteristics of a bifocal system employing the conventional grating design to one employing the grating of the invention. The light beam energy level is collected for the compared light beams after passing through the grating plate but before passing into the objective. Curvature 71 is the energy distribution characteristic curvature obtained from the light beam in the system employing the conventional grating, while curvature 72 is for the grating design of the invention.

Figure 7B:
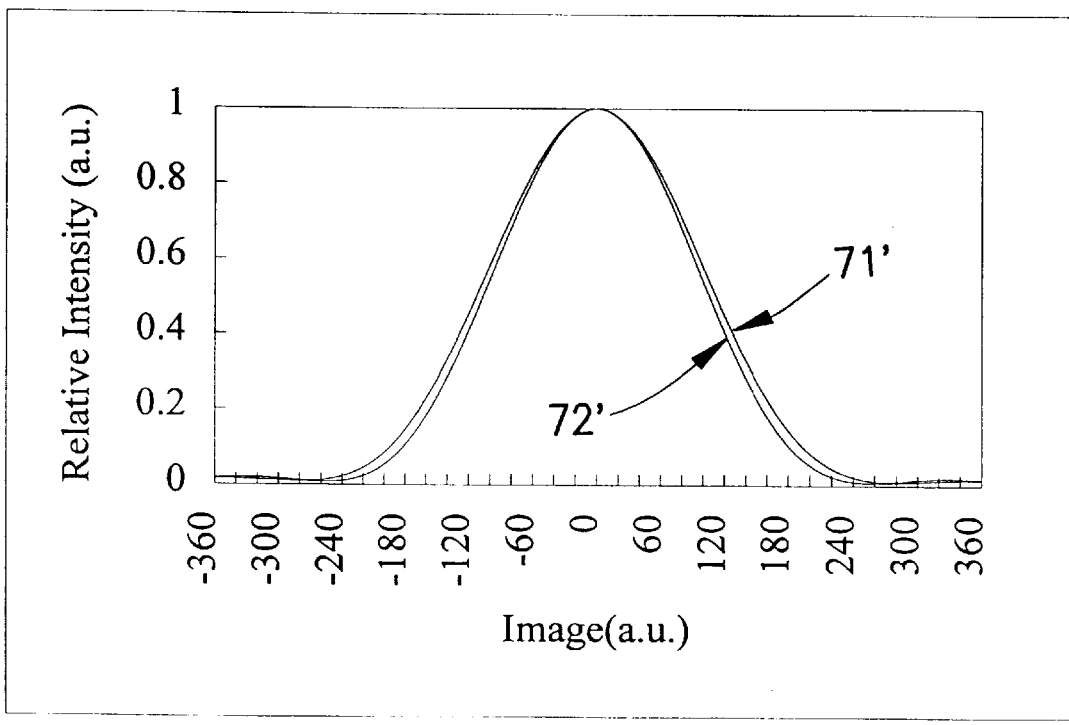
FIG. 7B is another comparison of the energy distribution characteristics of one bifocal system employing the conventional grating design to another employing the grating of the invention, wherein the light beam energy level is collected for the compared light beams after reaching the surface of the access compact disc media.

On the other hand, FIG. 7B is another comparison of the energy distribution characteristics of one bifocal system employing the conventional grating design to another employing the grating of the invention. The light beam energy level is collected for the compared light beams after reaching the surface of the access compact disc media. Curvature 71' is the energy distribution characteristic curvature obtained from the light beam reaching the disc in the system employing the conventional grating, while curvature 72' is for the grating design of the invention.

As a result of comparing the system employing the grating of the invention to that employing the conventional counterpart, it is clear that the size of the main image spot formed in the case of the DVD access is reduced due to basic principles of optical diffraction theory, and consequently, the RF signal reception characteristics are greatly improved.

Figure 8A:
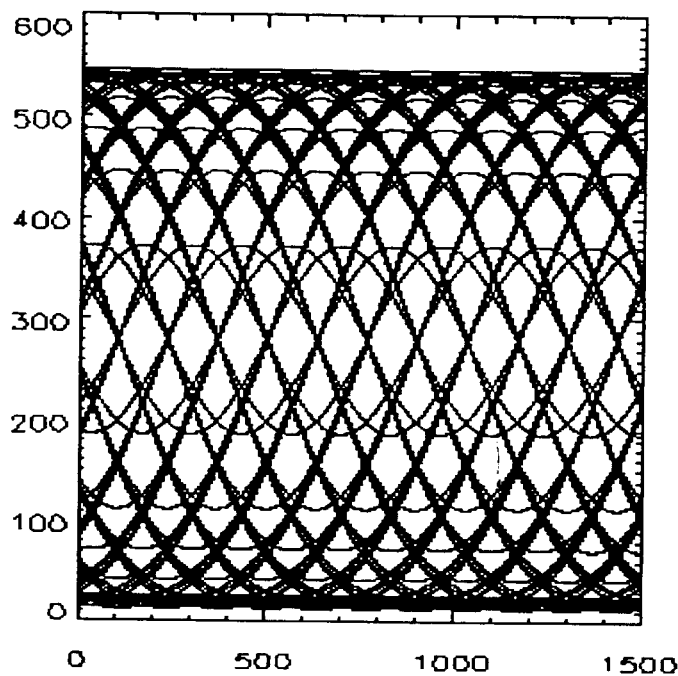
FIGS. 8A and 8B depict the eye pattern for the light beams passing through the grating of the invention and of the prior art respectively.
Figure 8B:
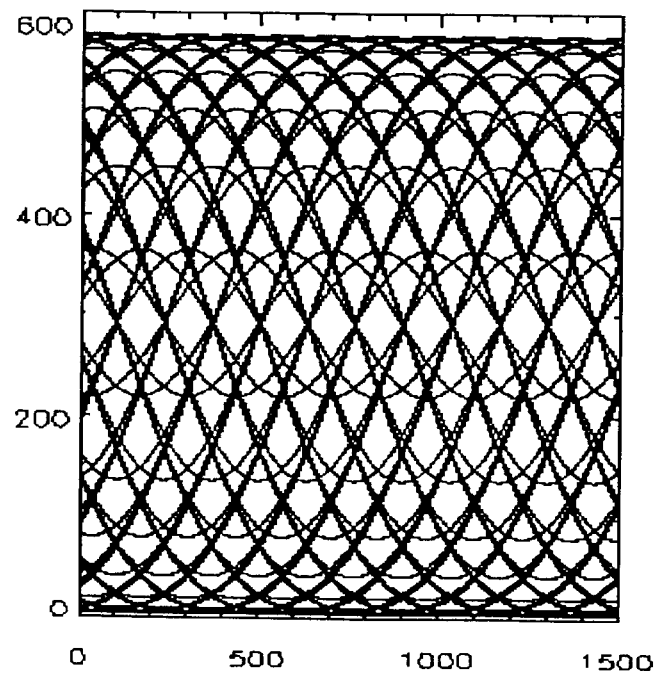
Figure 9:
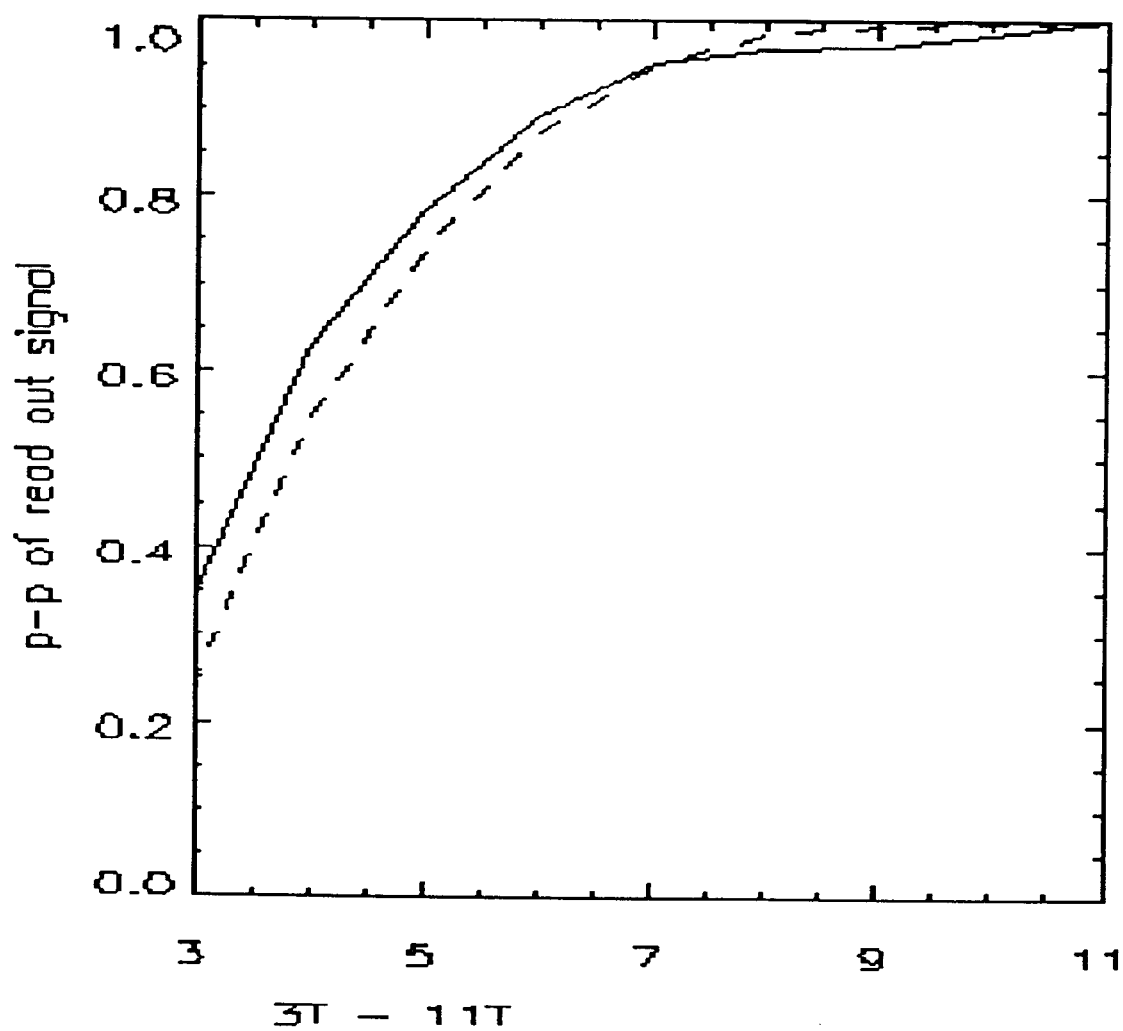
FIG. 9 compares the peak-to-peak ratio for the received signals (3T–11T) in the inventive and the prior-art bifocal system.

FIGS. 8A and 8B depict the eye pattern for the light beams passing through the grating of the invention and of the prior art respectively. A comparison immediately results in the conclusion that the 3T signal intensity is greatly increased. For a numerical scale of the degree of increase, refer to FIG. 9, in which the curvature representing the peak-to-peak intensity ratio for the received signals (3T–11T) in the inventive and the prior-art bifocal system is outlined. For the 3T signal, there is observed an increase of approximately 10 percent.

Thus, it can be concluded that the grating design of the invention is superior in achieved performance to the prior art in at least the following aspects:

First, the grating design of the invention is much simpler and costs less to fabricate than that of the comparable prior art featuring light filtering capability.

Secondly, the grating design of the invention is capable of achieving smaller-sized imaging spot over the target surface. This is particularly suitable for access to high-density compact disc formats such as the up-coming DVD standard. This can be directly translated into higher access resolution, which means more stable data reading even under inference conditions wherein system tracking subject to vibration.

While the invention has been described by way of example and in terms of preferred embodiment, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical grating plate for a bifocal optical access head assembly of an optical disk drive device, the device being capable of accessing data on a surface of optical disks arranged in one of two formats, and the optical head assembly comprising an optical system that includes the grating plate and an objective, wherein the grating plate contains the grating pattern, and the objective focuses a light beam onto the data surface of the accessed optical disk; said grating plate comprising:

a first region containing no grating; and a second region containing grating, wherein a light beam passing through the first region is incident to the cross-sectional aperture of the objective lens for the first format of optical disk, and a light beam passing through the second region of the grating pattern is incident to the cross-sectional aperture of the objective lens for the second format of optical disk; and wherein the first region comprises first and second triangular-shaped sub-regions, said second region is substantially linear and is disposed between said first and second triangular-shaped regions.

2. An optical grating plate for a bifocal optical access head assembly of an optical disk drive device, the device being capable of accessing data on a surface of optical disks arranged in one of two formats, and the optical head assembly comprising an optical system that includes the grating plate and an objective, wherein the grating plate contains the grating pattern, and the objective focuses a light beam onto the data surface of the accessed optical disk; said grating plate comprising:

a first region containing no grating; and a second region containing grating, wherein a light beam passing through the first region is incident to the cross-sectional aperture of the objective lens for the first format of the optical disk, and a light beam passing through the second region of the grating pattern is incident to the cross-sectional aperture of the objective lens for the second format of the optical disk; and wherein the second region comprises first and second sub-regions, each with at least first, second and third sides, the first region having a contour such that it is disposed between said first and second sub-regions and immediately adjacent to said first, second and third sides of each sub region.

3. An optical grating plate for a bifocal optical access head assembly of an optical disk drive device, the device being capable of accessing data on a surface of optical disks arranged in one of two formats, and the optical head assembly comprising an optical system that includes the grating plate and an objective, wherein the grating plate contains the grating pattern, and the objective focuses a light beam onto the data surface of the accessed optical disk; said grating plate comprising:

a first region containing no grating; and a second region containing grating, wherein the first region substantially surrounds the second region, wherein a light beam passing through the first region is incident to the cross-sectional aperture of the objective lens for the first format of the optical disk, and a light beam passing through the second region of the grating pattern is incident to the cross-sectional aperture of the objective lens for the second format of the optical disk; and wherein the cross-sectional aperture of the objective lens for accessing the optical disk of the first format has a size larger than the size of the cross-sectional aperture of the objective lens for accessing the optical disk of the second format.

4. An optical grating plate for a bifocal optical access head assembly of an optical disk drive device, the device being capable of accessing data on a surface of optical disks arranged in one of two formats, and the optical head assembly comprising an optical system that includes the grating plate and an objective, wherein the grating plate contains the grating pattern, and the objective focuses a light beam onto the data surface of the accessed optical disk; said grating plate comprising:

a first region containing no grating; and a second region containing grating, wherein the first region substantially surrounds the second region, wherein a light beam passing through the first region is incident to the cross-sectional aperture of the objective lens for the first format of the optical disk, and a light beam passing through the second region of the grating pattern is incident to the cross-sectional aperture of the objective lens for the second format of the optical disk; and wherein the objective lens for the second format of the accessed optical disk has a numerical aperture of approximately 0.38.

5. An optical grating plate according to any one of claims 1, 2 and 3, wherein the cross-sectional aperture of the objective lens for accessing the optical disk of the first format has a size that falls completely inside the first region of the grating pattern.

6. An optical grating plate according to any one of claims 1, 2 and 3, wherein the objective lens for the first format of the accessed optical disk has a numerical aperture of approximately 0.6.

7. An optical grating plate according to any one of claims 1, 2 and 3, wherein the first format of the optical disk is the Digital Video Disc format.

8. An optical grating plate according to any one of claims 1, 2 and 3, wherein the second format of the optical disk is the Compact Disc Format.

9. An optical grating plate according to any one of claims 1, 2 and 3, wherein the first format of the optical disk is the Compact Disc Read-Only Memory format.

10. An optical grating plate according to any one of claims 1, 2 and 3, wherein the second format of the optical disk is the Compact Disc Read-Only Memory format.

11. An optical grating plate according to any one of claims 1, 2 and 3, wherein the optical access head assembly of the optical disk drive device is a read- and write-access head assembly.

12. An optical grating plate according to any one of claims 1, 2 and 3, wherein the optical access head assembly of the optical disk drive device is a read-access head assembly.

* * * * *